(12) United States Patent
Uramatsu et al.

(10) Patent No.: US 8,001,095 B2
(45) Date of Patent: Aug. 16, 2011

(54) METHOD OF UPDATING A VERSION OF AN APPLICATION PROGRAM

(75) Inventors: Naoyuki Uramatsu, Tokyo (JP); Tomoki Ohkawa, Tokyo (JP); Wataru Negishi, Tokyo (JP); Toshiyuki Yamasaki, Tokyo (JP); Osamu Tokunaga, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1647 days.

(21) Appl. No.: 11/055,534

(22) Filed: Feb. 11, 2005

(65) Prior Publication Data
US 2005/0193387 A1    Sep. 1, 2005

(30) Foreign Application Priority Data

Feb. 12, 2004    (JP) ................................ P2004-035718

(51) Int. Cl.
*G06F 7/04* (2006.01)
(52) U.S. Cl. ........................................ 707/695; 717/170
(58) Field of Classification Search ........................ None
See application file for complete search history.

(56) References Cited

U.S. PATENT DOCUMENTS

| | | | | |
|---|---|---|---|---|
| 4,558,413 A * | 12/1985 | Schmidt et al. | ............... | 717/170 |
| 6,195,796 B1 * | 2/2001 | Porter | ............... | 717/122 |
| 6,532,588 B1 * | 3/2003 | Porter | ............... | 717/170 |
| 6,892,207 B2 * | 5/2005 | McKay et al. | ............... | 707/101 |
| 7,164,435 B2 * | 1/2007 | Wang et al. | ............... | 348/14.08 |
| 2004/0218034 A1 * | 11/2004 | Wang et al. | ............... | 348/14.1 |
| 2004/0220980 A1 * | 11/2004 | Forster | ............... | 707/204 |
| 2007/0083571 A1 * | 4/2007 | Meller et al. | ............... | 707/203 |
| 2007/0150524 A1 * | 6/2007 | Eker et al. | ............... | 707/203 |

FOREIGN PATENT DOCUMENTS

| | | |
|---|---|---|
| JP | 7-219865 A | 8/1995 |
| JP | 8-249163 A | 9/1996 |
| JP | 10-154121 A | 6/1998 |
| JP | 11-003212 | 1/1999 |
| JP | 11-110223 A | 4/1999 |
| JP | 11-212794 A | 8/1999 |
| JP | 2000-35879 A | 2/2000 |
| JP | 2001-249885 A | 9/2001 |
| JP | 2001-325107 A | 11/2001 |
| JP | 2003-177921 A | 6/2003 |
| JP | 2003-309832 | 10/2003 |

OTHER PUBLICATIONS

Microsoft® Computer Dictionary 549 (5th ed. 2002).*
Japanese Office Action dated Sep. 8, 2009.

* cited by examiner

*Primary Examiner* — Charles Kim
*Assistant Examiner* — Hubert Cheung
(74) *Attorney, Agent, or Firm* — Sughrue Mion, PLLC

(57) ABSTRACT

A version update method is provided for updating a version of a communication system application program installed in a plurality of terminals connected to a communication network and operating between at least two terminals. The method includes: starting communications between the two of the plurality of terminals; exchanging version information of the communication system application program between the two terminals communicating with each other and making a comparison between the version information held in one terminal and that in the other; making a request for transmitting the communication system application program file of the version not held in either terminal; and transmitting the communication system application program file of the specified version to the terminal making the request.

4 Claims, 3 Drawing Sheets

METHOD OF UPDATING A VERSION OF AN APPLICATION PROGRAM

The present disclosure relates to the subject matter contained in Japanese Patent Application No. 2004-035718 filed on Feb. 12, 2004, which is incorporated herein by reference in its entirety.

BACKGROUND OF THE INVENTION

1. Field of the Invention

The present invention relates to a version update method and a version update program of a communication system application program.

2. Description of the Related Art

An application program (software) usually undergoes various updates of improvement of an already existing function, addition of a new function, etc., for enhancing the essential performance of the program and enlarging the scope of the program.

However, if an update makes its appearance, the already introduced old version is not necessarily weeded out and when a certain time period has elapsed, a further update advances, resulting in mixing various versions of the program.

For example, in an application program for transferring data via a network such as remote data conference or videoconference, which will be hereinafter referred to as communication system program, if definition of the communication procedure of data, the communication format of data, etc., is not precise, it is also assumed that communication cannot be conducted. Thus, compatibility among the versions (communications can be conducted among the versions) becomes more important even for the same application program.

To update the communication system program, it becomes difficult to make drastic improvement concerning communications (procedure change, data addition, etc.,) to maintain upward compatibility.

At present, to promote updates of application programs, each software vender provides a site for updating application programs on their respective home pages, etc., and executes a downloading service into the user via the Internet (a manual system of the user and an automatic system such that when the operating apparatus of the application program such as a PC is started, the service is conducted are available).

An example of updating an application program in the related art will be discussed with FIG. 1.

In FIG. 1, numeral 1 denotes a downloading site (server) for the software vender creating a communication system application program to update the communication system application program. The downloading site 1 (server) is provided on the home page, etc., for executing downloading service into the user via the Internet. Numerals 2-1 and 2-2 denote terminals in which the communication system application program is installed; they are connected through a communication network 3 such as the Internet or an intracompany LAN.

Updating the version of the communication system application program in FIG. 1 is executed as follows. First, the terminal (PC) (client A) 2-1 is started (step S1) and the communication system application program (communication system software) is started. (Step S2). Next, the downloading site (server) is accessed through the communication network 3 and update information of the communication system application program is acquired. (Step S3). In the terminal 2-1, the version information acquired from the downloading site 1 is compared with the version information held in the terminal 2-1 and if a new version not held in the terminal 2-1 exists, a request to download the communication system application program of the new version is sent to the downloading site 1 (server) (Step S4). In the terminal 2-1, the communication system application program is replaced with the communication system application program received from the downloading site 1 (Step S5).

At step S5, both the new-version communication system application program and the old-version communication system application program can also be held without replacing the old-version communication system application program with the new-version communication system application program.

In the terminal (PC) (client B) 2-2, version update of the communication system application program is also executed in a similar manner to that described above. The terminal 2-2 and the server 1 are connected with each other via the Internet 3 in the same way. However, the illustration of the connection between the terminal 2-2 and the server 1 is omitted in FIG. 1.

Point-to-point (PtoP) communications using the new-version communication system application program are made possible between the terminal (PC) (client A) 2-1 and the terminal (PC) (client B) 2-2.

As the version update art of an application program, the following system is disclosed in JP-A-2000-035879.

"In an information system of client-server type with a server computer and a client computer connected by a communication line, a client application update system comprising a version management program for making a comparison between version information of each application in the client computer and version information of each application in the server computer and the application requiring version update as the result of the comparison is downloaded from the server computer into the client computer, thereby updating the version of the client application, characterized by means for retaining version information of the version management program (which will be hereinafter referred to as management program version information) in the server computer and the client computer, means for making a comparison between the management program version information in the client computer and the management program version information in the server computer when the version management program is started, means for downloading the version management program of the newest version existing in the server computer into the client computer for storage if version update is required as the result of the comparison, and means for starting the version management program of the newest version stored in the client computer as the version management program at the timing at which power is again turned on after off. (c.f. claim 1 of JP-A-2000-035879)"

As the version update art of an application program, the following system is disclosed in JP-A-2003-177921.

"An application maintenance system comprising a customer who uses a purchased application program in a customer terminal, an application vendor for developing the application program, the application vendor having in a vendor server a database containing fault information about fault occurring in the application program, module information of the application program with the fault corrected, customer information containing the name of the customer using the application program, and the version number of the application program used by the customer, a shop for selling the application program, the shop having a shop terminal for sending application program information of the application program purchased by the customer and the customer information to the application vendor, and a network for connecting the customer terminal, the vendor server, and the shop terminal, characterized in that the fault information about the fault occurring in the customer terminal is automatically collected and the corrected module of the application program to which a correction has been made according to the fault information is automatically applied to the customer terminal (c.f. claim 1 of JP-A-2003-177921)".

Further, as the version update art of an application program, the following system is disclosed in JP-A-11-212794.

"A program correction system wherein from a disk storing different programs for each version, the program is loaded, whereby an old program can be corrected to the new program, characterized in that a plurality of programs are transferred to the disk for each version from a remote terminal and any desired version is specified from the programs, whereby the program corresponding to the version is loaded (c.f. claim 1 of JP-A-11-212794)".

SUMMARY OF THE INVENTION

The version update of the communication system application program in the related art described above involves the following problems:

(a) It is necessary to construct a downloading site (server) for executing update on the home page.
(b) Various costs such as the operation cost of the downloading site (server), etc., in addition to the facilities and the environment for communicating with the client and information management concerning update occur.
(c) If the Internet is not used as the network infrastructure, the terminal must also exist in the Internet environment.
(d) There is no solution to the point that restrictions occur on the update range to maintain upward compatibility.

As the problems to be solved by the invention, the problems in the version update of the communication system application program in the related arts described above are named by way of example.

According to a first aspect of the invention, there is provided a version update method for updating a version of a communication system application program installed in a plurality of terminals connected to a communication network and operating between at least two terminals, the method including: starting communications between the two of the plurality of terminals; exchanging version information of the communication system application program between the two terminals communicating with each other and making a comparison between the version information held in one terminal and that in the other; making a request for transmitting the communication system application program file of the version not held in either terminal; and transmitting the communication system application program file of the specified version to the terminal making the request.

According to a second aspect of the invention, there is provided a version update method for updating a version of a communication system application program installed in a plurality of terminals connected to a communication network and operating between at least two terminals, the method including: starting communications between the two of the plurality of terminals; exchanging version information of the communication system application program between the two terminals communicating with each other and making a comparison between the version information held in one terminal and that in the other; starting the communication system application program with the version common to the two terminals among the versions held in the two terminals and executing the communication system application program; making a request for transmitting the communication system application program file of the version not held in either terminal, after execution of the communication system application program; and transmitting the communication system application program file of the specified version to the terminal making the request.

According to a third aspect of the invention, there is provided a computer-readable program product for updating a version of a communication system application program installed in a plurality of terminals connected to a communication network and operating between at least two terminals, the program product for causing a computer to execute: starting communications between the two of the plurality of terminals; exchanging version information of the communication system application program between the two terminals communicating with each other and making a comparison between the version information held in one terminal and that in the other; making a request for transmitting the communication system application program file of the version not held in either terminal; and transmitting the communication system application program file of the specified version to the terminal making the request.

According to a fourth aspect of the invention, there is provided a computer-readable program product for updating a version of a communication system application program installed in a plurality of terminals connected to a communication network and operating between at least two terminals, the program product for causing a computer to execute: starting communications between the two of the plurality of terminals; exchanging version information of the communication system application program between the two terminals communicating with each other and making a comparison between the version information held in one terminal and that in the other; starting the communication system application program with the version common to the two terminals among the versions held in the two terminals and executing the communication system application program; making a request for transmitting the communication system application program file of the version not held in either terminal, after execution of the communication system application program; and transmitting the communication system application program file of the specified version to the terminal making the request.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there are shown preferred embodiments of the invention.

The operation of a version update method of a communication system application program between terminals A and B using a communication network of an embodiment of the invention will be discussed with FIG. 2.

First, a terminal A 2-1 and a terminal B 2-2 are started and a communication system application program (communication system software) is started for starting communications between the terminals through a communication network 3. (Step S21)

Next, the terminal A requests the terminal B to send version information of the communication system application program through the communication network 3. (Step S22)

The terminal B transmits the version information of the communication system application program held in the terminal B to the terminal A. (Step S23)

Figure 1:
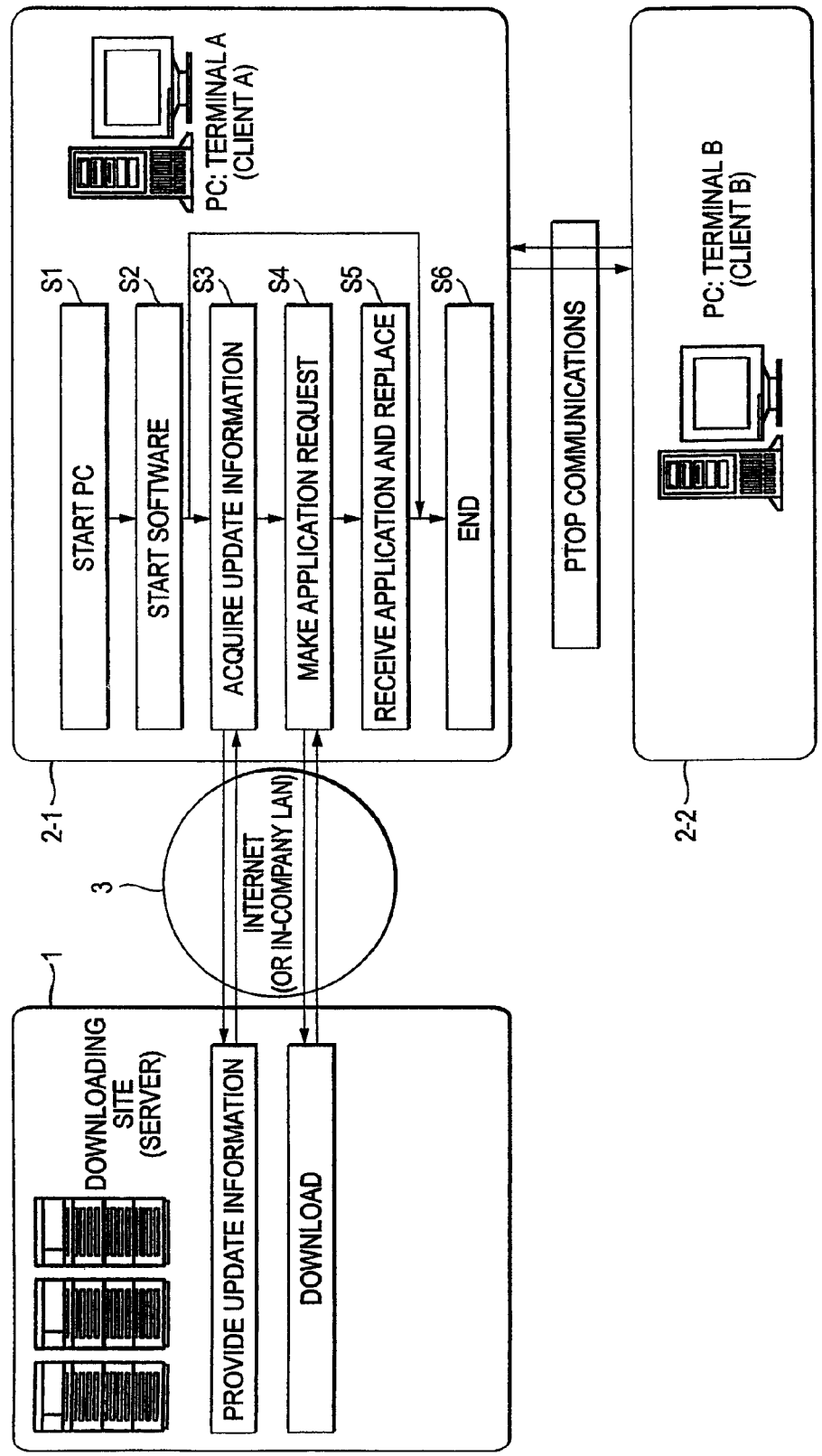
FIG. 1 is a drawing to show an example of updating an application program in a related art.
Figure 2:
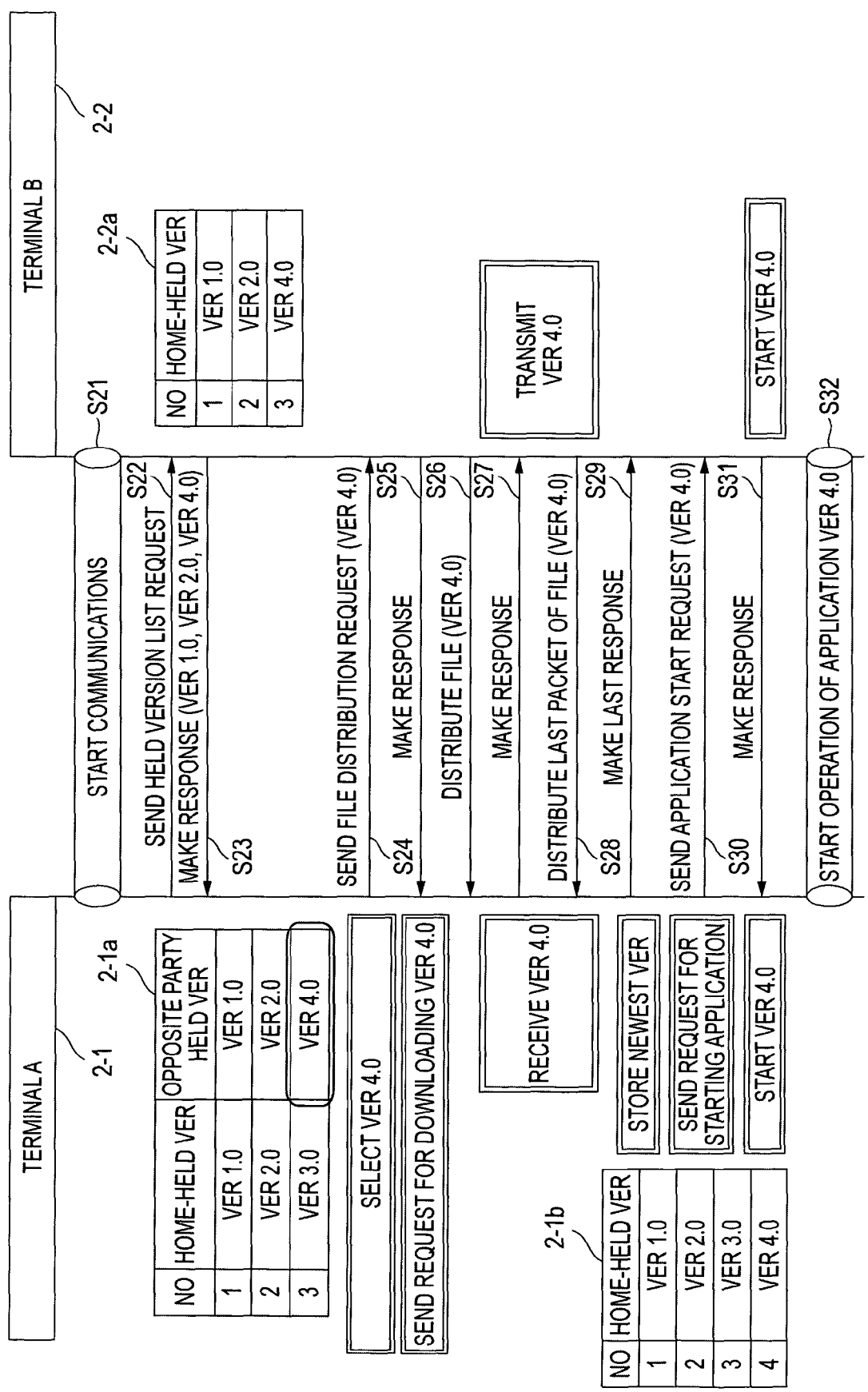
FIG. 2 is a drawing to show a processing procedure of a version update method of a communication system application program between terminals A and B using a communication network of an embodiment of the invention.

FIG. 2 shows a state in which the terminal A holds Ver1.0, Ver2.0, and Ver3.0 as the versions of the communication system application program and the terminal B holds Ver1.0, Ver2.0, and Ver4.0.

Upon reception of the version information of the communication system application program held in the terminal B from the terminal B at step S23, the terminal A creates a comparison list between the home-held versions (Ver) and the opposite party held versions (Ver), as shown in the figure.

From the comparison result based on the list, it is determined that the terminal A does not hold the version held in the terminal B (Ver4.0), and therefore the terminal A requests the terminal B to distribute the file of the version Ver4.0 (the program of the version Ver4.0 of the communication system application program). (Step S24)

Upon reception of the distribution request, the terminal B sends a response to the effect that the file of the version Ver4.0 is to be distributed (transmitted) to the terminal A. (Step S25).

The terminal B divides the file of the version Ver4.0 and starts to distribute (transmit) a packet to the terminal A. (Step S26).

Each time the terminal A receives the packet, it sends a response to the effect that the packet has been received to the terminal B. (Step S27)

Then, the terminal B distributes (transmits) the last packet of the divided file of the version Ver4.0 to the terminal A. (Step S28).

The terminal A sends a response to the effect that the last packet of the divided file has been received to the terminal B. (Step S29)

In this state, the terminal A holds Ver1.0, Ver2.0, Ver3.0, and Ver4.0 as the versions of the communication system application program.

Next, the terminal A requests the terminal B to start the application at Ver4.0. (Step S30)

The terminal B starts the application at Ver4.0 and sends a response to the effect that the application has been started to the terminal A. (Step S31)

Then, the Ver4.0 communication system application operates in the terminals A and B. (Step S32)

In the version update operation of the communication system application program between the terminals A and B using the communication network in FIG. 2, only the terminal A requests the terminal B to send the file of the new version, but a held version list request at step S22 may be executed mutually and the terminal B may request the terminal A to distribute the file of the unheld version.

Next, a modification of the version update method of the communication system application program between the terminals A and B using the communication network in FIG. 2 will be discussed with FIG. 3.

In this method, the terminal A 2-1 and the terminal B 2-2 are started and the communication system application program (communication system software) is started for starting communications between the terminals through the communication network 3. (Step S33)

Next, the terminal A requests the terminal B to send version information of the communication system application program through the communication network 3. (Step S34)

The terminal B transmits the version information of the communication system application program held in the terminal B to the terminal A. (Step S35)

Figure 3:
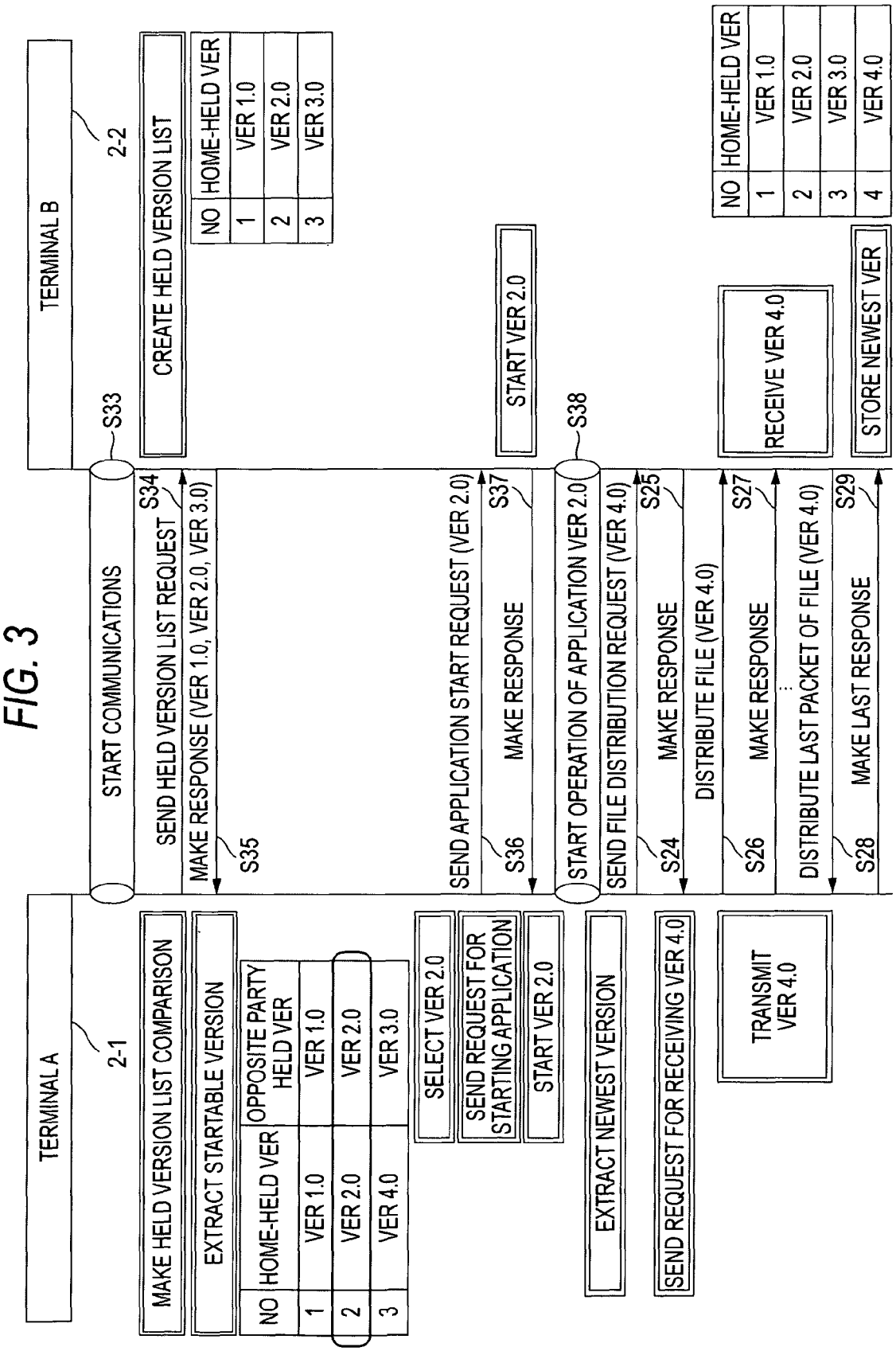
FIG. 3 is a drawing to show different operation of the version update method of the communication system application program between the terminals A and B using the communication network of the embodiment of the invention.

FIG. 3 shows a state in which the terminal A holds Ver1.0, Ver2.0, and Ver4.0 as the versions of the communication system application program and the terminal B holds Ver1.0, Ver2.0, and Ver3.0.

Upon reception of the version information of the communication system application program held in the terminal B from the terminal B at step S35, the terminal A creates a comparison list between the home-held versions (Ver) and the opposite party held versions (Ver), as shown in the figure.

The method up to this point is the same as the update method in FIG. 2. Then, in the modification in FIG. 3, the terminal A requests the terminal B to start the communication system application at ver2.0 communicatable at the current version without immediately requesting the terminal B to distribute the file of the version not held in the terminal A. (Step S36)

The terminal B starts the application at Ver2.0 and sends a response to the effect that the application has been started to the terminal A. (Step S37).

Then, the Ver2.0 communication system application operates in the terminals A and B. (Step S38).

After the operation of the Ver2.0 communication system application between the terminals A and B terminates, the version update operation is executed in the background in a similar manner to that at steps S24 to S29 in the update method in FIG. 2.

In the version update method, the operation of the communication system application between the terminals is executed at the highest priority at the operable version and version update is executed at a lower priority.

As described above, in the version update method of the communication system application program between the terminals A and B using the communication network of the embodiment, the version update of the communication system application program is executed between the terminals starting communications therebetween. Thus, as communications are repeated between terminals, if the version of the communication system application program of one terminal in the communication network is updated, the version of the communication system application program of every terminal in the communication network will be updated as communications are repeated among all terminals in the communication network.

As described above, in the embodiment of the invention, the version update method of the communication system application program includes the steps of starting communications between the two of the plurality of terminals; exchanging version information of the communication system application program between the two terminals communicating with each other and making a comparison between the version information held in one terminal and that in the other; making a request for transmitting the communication system application program file of the version not held in either terminal; and transmitting the communication system application program file of the specified version to the terminal making the request.

According to the configuration, it is not necessary to construct an update site on the home page or a server for update, so that jobs such as initial introduction of the server facilities, operation job for maintaining the server facilities, and file uploading and information management required for update are not required at all and thus the cost reduction effect for update is very high.

Since update is executed at the usual use time in the essentially used network infrastructure, the cost for providing an additional network does not occur.

Update can be executed in the background and stress on the user is reduced.

One of the particular advantages of the invention is as follows: If a version control function is included in update, drastic improvement concerning communications (procedure change, data addition, etc.,) can also be accomplished easily to some extent.

In the embodiment of the invention, the version update method includes the steps of starting communications between the two of the plurality of terminals; exchanging version information of the communication system application program between the two terminals communicating with each other and making a comparison between the version information held in one terminal and that in the other; starting the communication system application program with the version common to the two terminals among the versions held in the two terminals and executing the communication system application program; after execution of the communication system application program, making a request for transmitting the communication system application program file of the version not held in either terminal; and transmitting the communication system application program file of the specified version to the terminal making the request.

According to the configuration, the communication system application program is first started with the version common to the terminals among the versions of the communication system application program held in the terminals and is executed and then file exchange of unheld version can be executed in the background.

Further, according to the version update method or program of the communication system application program of the embodiment of the invention, it is not necessary to construct an update site on the home page or a server for update, so that jobs such as initial introduction of the server facilities, operation job for maintaining the server facilities, and file uploading and information management required for update are not required at all and thus the cost reduction effect for update is very high.

Since update is executed at the usual use time in the essentially used network infrastructure, the cost for providing an additional network does not occur.

Update can be executed in the background and stress on the user is reduced.

One of the particular advantages of the invention is as follows: If a version control function is included in update, drastic improvement concerning communications (procedure change, data addition, etc.,) can also be accomplished easily to some extent. Thus, the industrial applicability of the invention is extremely large.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A version update method for updating a version of a communication system application program installed in a plurality of terminals connected to a communication network and operating between at least two terminals, the version update method comprising:
    starting communications between a first terminal and a second terminal of the plurality of terminals;
    exchanging version information of the communication system application program between the first terminal and the second terminal and making a comparison between the version information held in the first terminal and the version information held in the second terminal;
    starting the communication system application program with a version common to the first terminal and the second terminal among the versions held in the first terminal and the second terminal and executing the communication system application program;
    making a request for a communication system application program file of a version not held in one of the first terminal and the second terminal, after the executing of the communication system application program; and
    transmitting the requested communication system application program file to the one of the first terminal and the second terminal making the request.

2. The version update method as claimed in claim 1, wherein the communication system application program is a program for a remote data conference or a videoconference operating between the plurality of terminals connected through the communication network.

3. A computer-readable program product stored on a non-transitory computer-readable storage medium for updating a version of a communication system application program installed in a plurality of terminals connected to a communication network and operating between at least two terminals, the computer-readable program product for causing a computer to execute:
    starting communications between a first terminal and a second terminal of the plurality of terminals;
    exchanging version information of the communication system application program between the first terminal and the second terminal and making a comparison between the version information held in the first terminal and the version information held in the second terminal;
    starting the communication system application program with a version common to the first terminal and the second terminal among the versions held in the first terminal and the second terminal and executing the communication system application program;
    making a request for a communication system application program file of a version not held in one of the first terminal and the second terminal, after the executing of the communication system application program; and
    transmitting the requested communication system application program file to the one of the first terminal and the second terminal making the request.

4. The computer-readable program product as claimed in claim 3, wherein the communication system application program is a program for a remote data conference or a videoconference operating between the plurality of terminals connected through the communication network.

* * * * *